United States Patent
Handa

(10) Patent No.: US 11,295,453 B2
(45) Date of Patent: Apr. 5, 2022

(54) IMAGE PROCESSING APPARATUS, TRANSMISSION METHOD, AND STORAGE MEDIUM

(71) Applicant: CANON KABUSHIKI KAISHA, Tokyo (JP)

(72) Inventor: Masahiro Handa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 16/809,957

(22) Filed: Mar. 5, 2020

(65) Prior Publication Data
US 2020/0311947 A1 Oct. 1, 2020

(30) Foreign Application Priority Data

Mar. 28, 2019 (JP) ............................. JP2019-064367

(51) Int. Cl.
*G06T 7/194* (2017.01)
*G06T 7/174* (2017.01)

(52) U.S. Cl.
CPC .............. *G06T 7/194* (2017.01); *G06T 7/174* (2017.01); *G06T 2207/20021* (2013.01); *G06T 2207/20212* (2013.01)

(58) Field of Classification Search
CPC . G06T 7/11; G06T 2207/10016; G06T 7/194; G06T 2207/20021; G06T 7/174; G06T 2207/20212; H04N 7/183
See application file for complete search history.

(56) References Cited

U.S. PATENT DOCUMENTS

| | | | | |
|---|---|---|---|---|
| 5,892,856 A * | 4/1999 | Cooper | ..................... | G06T 7/20 |
| | | | | 382/291 |
| 8,412,027 B2 * | 4/2013 | Kamada | ............... | G11B 27/034 |
| | | | | 386/241 |
| 9,092,868 B2 * | 7/2015 | Tojo | .......................... | G06T 7/11 |
| 9,247,129 B1 * | 1/2016 | Gray | .......................... | G06T 5/30 |
| 9,846,810 B2 * | 12/2017 | Partis | ................ | G06K 9/00778 |
| 10,694,104 B2 * | 6/2020 | Kawai | .................... | H04N 5/272 |
| 10,699,473 B2 * | 6/2020 | Shikata | ................... | G06T 7/194 |
| 10,755,471 B2 * | 8/2020 | Umemura | ............... | H04N 7/18 |
| 11,012,674 B2 * | 5/2021 | Morisawa | ........ | H04N 5/232941 |
| 11,024,036 B2 * | 6/2021 | Furukawa | .............. | H04N 5/147 |

(Continued)

FOREIGN PATENT DOCUMENTS

JP 2017-211828 A 11/2017
JP 2017212593 A * 11/2017 ........... G06T 15/205

OTHER PUBLICATIONS

Study on Target detection of probability based on pixel (Year: 2020).*

(Continued)

*Primary Examiner* — Nizar N Sivji
(74) *Attorney, Agent, or Firm* — Canon U.S.A., Inc. IP Division

(57) ABSTRACT

An image processing apparatus, that transmits a foreground image including an object and a background image not including the object in order to reproduce a predetermined image generated by combining the foreground image and the background image, acquires the foreground image and the background image, divides the background image, and transmits the acquired foreground image and the divided background images.

21 Claims, 8 Drawing Sheets

(56) References Cited

U.S. PATENT DOCUMENTS

| | | | | |
|---|---|---|---|---|
| 2009/0290796 A1* | 11/2009 | Shi | ............................ | G06T 7/194 |
| | | | | 382/173 |
| 2013/0170557 A1* | 7/2013 | Wang | ........................ | G06T 7/11 |
| | | | | 375/240.24 |
| 2014/0003720 A1* | 1/2014 | Seow | .................. | G06K 9/00771 |
| | | | | 382/173 |
| 2014/0132789 A1* | 5/2014 | Koyama | .................. | G06T 7/194 |
| | | | | 348/218.1 |
| 2014/0199048 A1* | 7/2014 | Nobori | .................. | G11B 27/031 |
| | | | | 386/278 |
| 2015/0278616 A1* | 10/2015 | Li | ............................ | G06T 7/194 |
| | | | | 382/103 |
| 2015/0310297 A1* | 10/2015 | Li | .............................. | G06T 7/11 |
| | | | | 382/199 |
| 2016/0004929 A1* | 1/2016 | Varghese | ............ | G06K 9/00624 |
| | | | | 382/103 |
| 2018/0300884 A1* | 10/2018 | Schulte | ..................... | G06T 5/50 |
| 2020/0293766 A1* | 9/2020 | Huang | ..................... | G06T 7/251 |
| 2020/0322591 A1* | 10/2020 | Yano | ...................... | G06T 15/205 |

OTHER PUBLICATIONS

Background Modeling and Foreground Extraction Scheme for HD Traffic Bayonet (Year: 2014).*

* cited by examiner

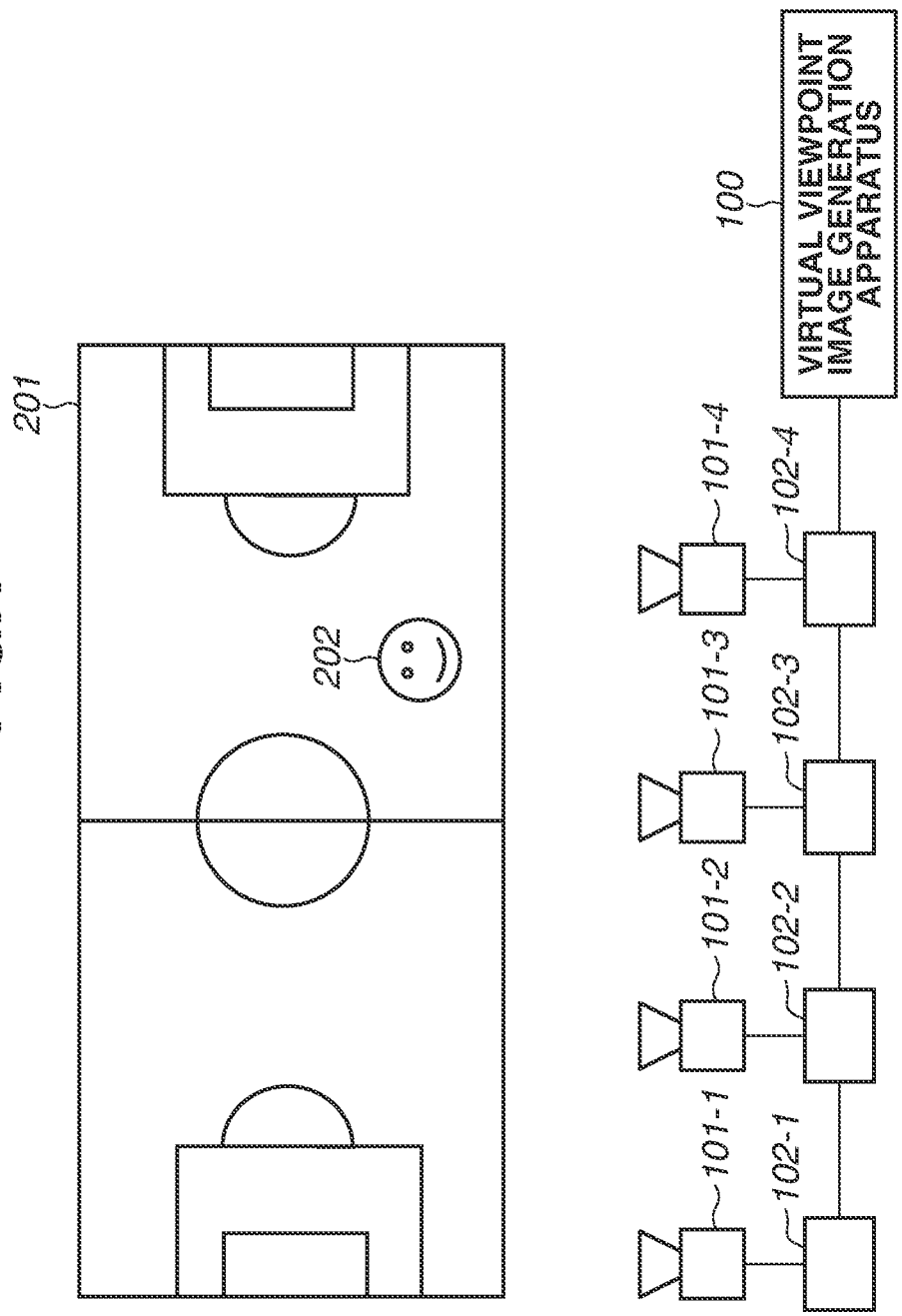

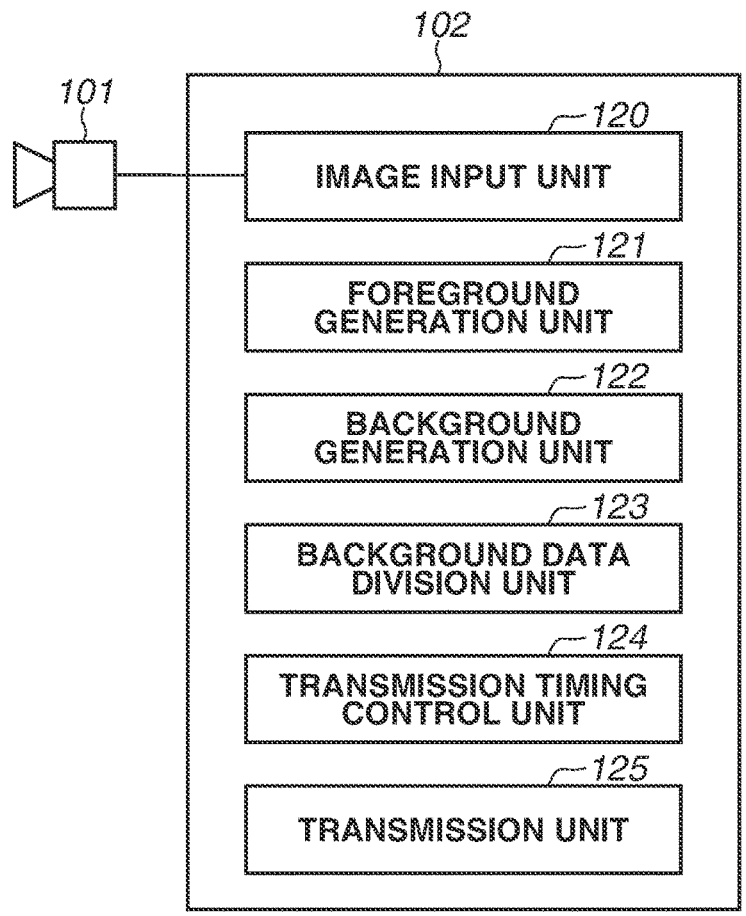
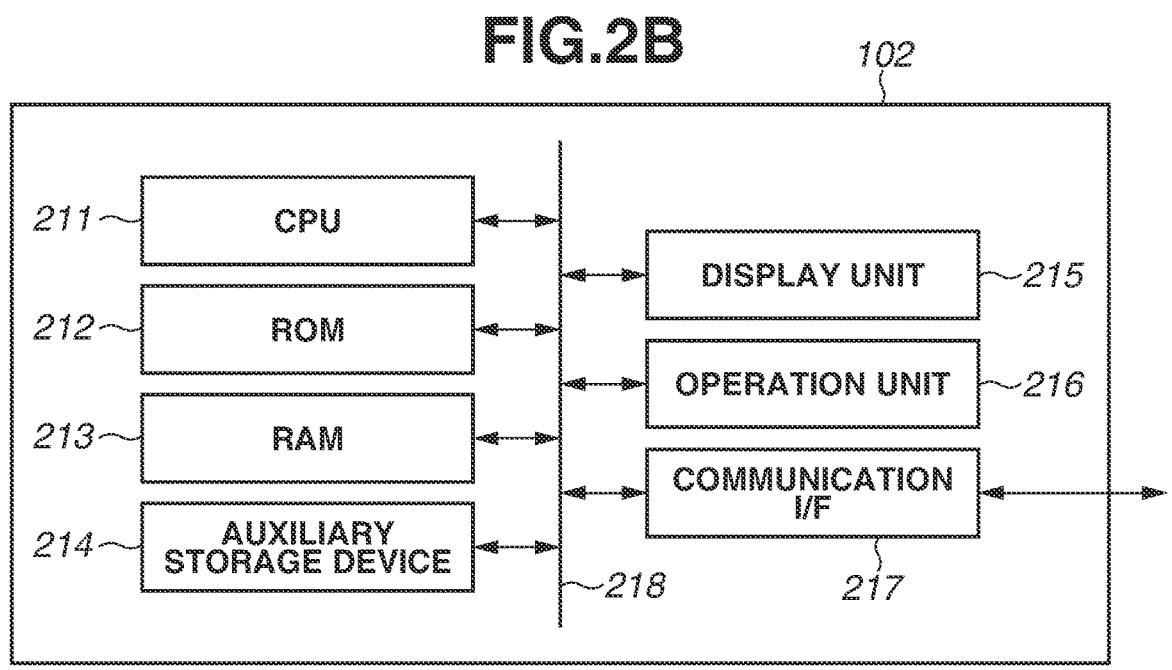

IMAGE PROCESSING APPARATUS, TRANSMISSION METHOD, AND STORAGE MEDIUM

BACKGROUND

Field of the Disclosure

The present disclosure relates to an image processing apparatus, a transmission method, and a storage medium.

Description of the Related Art

Techniques, which generate virtual viewpoint images based on arbitrary viewpoints using a plurality of images of objects which are synchronously captured from a plurality of directions by a plurality of image capturing apparatuses installed on different positions, have been attracting attention. According to such techniques, for example, highlight scenes of football and basketball games can be viewed from various angles, and thus users can feel higher realistic sensations compared with usual images.

Generation and browsing of a virtual viewpoint image requires collection of images captured by a plurality of image capturing apparatuses in an image generation apparatus such as a server and image processing such as three-dimensional model generation and rendering by the image generation apparatus. In order to generate a virtual viewpoint image which does not give a user a feeling of strangeness, it is necessary to transmit images captured by the plurality of image capturing apparatuses at the same time to the image generation apparatus by a next imaging time and perform various image processing thereon. Accordingly, a data amount of images to be transmitted is increased compared with image capturing using a single image capturing apparatus, and a technique, which can protect a transmission band from breaking down, is required.

Japanese Patent Application Laid-Open No. 2017-211828 discusses a technique for setting a generation frame rate of a foreground image including an object with a motion such as a person higher than a generation frame rate of a background image which does not include the object. In this way, the technique can prevent deterioration of image quality by outputting at a high frame rate a foreground image including an important imaging target such as a player while suppressing a transmission data amount by outputting a background image not include such an important imaging target at a low frame rate.

However, according to the technique described in Japanese Patent Application Laid-Open No. 2017-211828, both of the foreground image and the background image are transmitted at a timing at which the background image is transmitted, so that the transmission data amount is larger than that at a timing at which the background image is not transmitted. Accordingly, only the transmission of the background image and the foreground image may not be completed by a next imaging timing. Further, even if the transmission thereof is completed, a processing amount of a subsequent image generation apparatus is increased by an amount of the background image only at the timing at which the background image is received, so that the processing may not be completed by a time at which a next captured image is processed. As a result, a time at which the virtual viewpoint image cannot be generated occurs, and if the generated virtual viewpoint image is continuously reproduced, there may be a discontinuity of the image, which may give a user a feeling of strangeness.

SUMMARY

The present disclosure is directed to a technique for reducing a possibility of occurrence of failure caused by transmitting background images all at the same timing when foreground images and the background images generated from images captured by an image capturing apparatus are transmitted.

According to an aspect of the present disclosure, an image processing apparatus that transmits a foreground image including an object and a background image not including the object in order to reproduce a predetermined image generated by combining the foreground image and the background image, includes an acquisition unit configured to acquire the foreground image generated from an image captured by an image capturing apparatus and the background image generated from the image captured by the image capturing apparatus, a frequency of the background image necessary for reproducing the predetermined image being lower than that of the foreground image, a division unit configured to divide the background image acquired by the acquisition unit, and a transmission unit configured to transmit the foreground image acquired by the acquisition unit, wherein the transmission unit transmits the background images divided by the division unit at different timings.

Further features of the present disclosure will become apparent from the following description of exemplary embodiments with reference to the attached drawings.

BRIEF DESCRIPTION OF THE DRAWINGS

FIG. 1 is a configuration diagram illustrating a virtual viewpoint image generation system.

FIGS. 2A and 2B are block diagrams respectively illustrating a functional configuration and a hardware configuration of an image processing apparatus.

DESCRIPTION OF THE EMBODIMENTS

Figure 3:
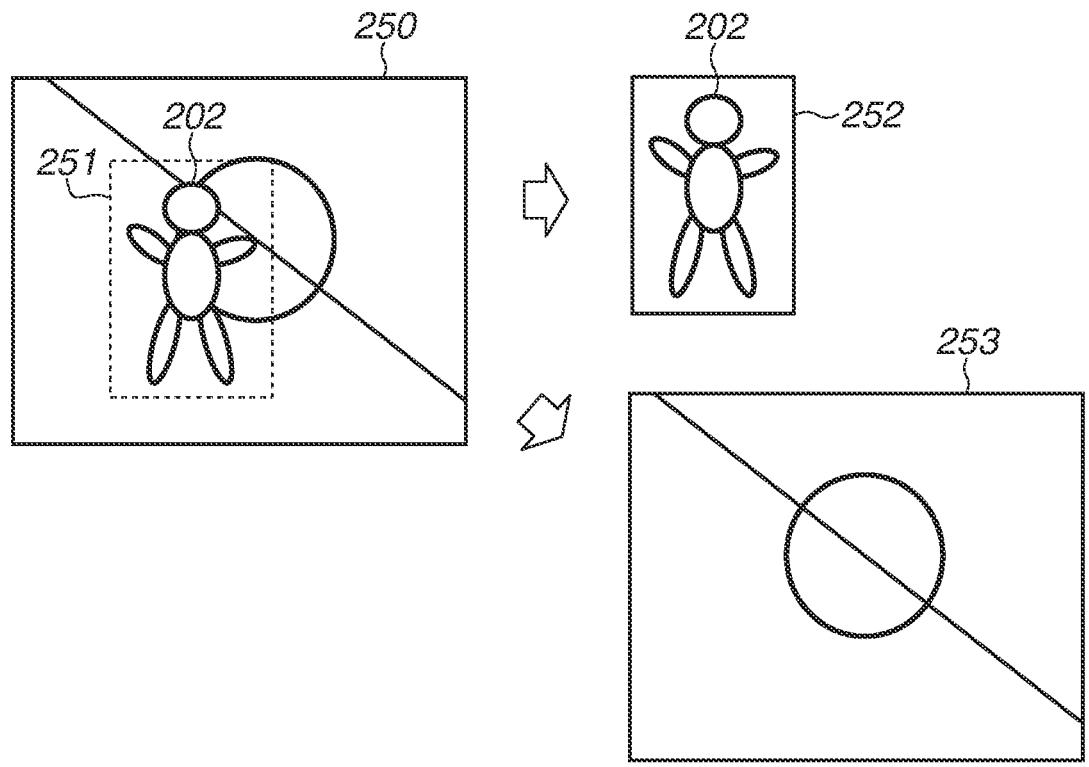
FIG. 3 is a conceptual diagram illustrating a foreground image and a background image to be generated by the image processing apparatus.

According to an exemplary embodiment of the present disclosure, an example is described in which a virtual viewpoint image based on an arbitrary viewpoint is generated based on multi-viewpoint images captured by a plurality f image capturing apparatuses installed on different positions. Terms are confirmed prior to descriptions of the present exemplary embodiment. A virtual viewpoint image is an image generated by an end user and/or an appointed operator freely operating a position and an orientation of a virtual camera and is also referred to as a free viewpoint image and an arbitrary viewpoint image. A virtual viewpoint image to be generated and a multi-viewpoint image to be a source of the virtual viewpoint image may be a moving image and a still image. In other words, a term "image" includes concepts of both of a moving image and a still image in the present specification. An example is mainly described below in which a multi-viewpoint image to be input and a virtual viewpoint image to be output are both moving images.

FIG. 1 is a block diagram illustrating a configuration of a virtual viewpoint image generation system according to the present exemplary embodiment.

A virtual viewpoint image generation apparatus 100 is an apparatus that receives foreground images and background images described below from image processing apparatuses 102-1 to 102-4 and generates a virtual viewpoint image by combining the foreground image to the background image. The generated virtual viewpoint image may be reproduced by the virtual viewpoint image generation apparatus 100 and may be reproduced by other information processing apparatuses such as a mobile phone, a tablet computer, and a television.

Image capturing apparatuses 101-1 to 101-4 are apparatuses such as digital video cameras, which capture images. Unless otherwise noted, the image capturing apparatuses 101-1 to 101-4 are collectively referred to as an image capturing apparatus(es) 101. It is not illustrated, but the image capturing apparatuses 101 are arranged to surround a field of a stadium 201 as an image capturing area. According to the present exemplary embodiment, an example is described in which four image capturing apparatuses are arranged. However, the number of apparatuses to be arranged is not limited thereto, and any number of the image capturing apparatuses may be arranged. Further, the image capturing apparatus 101 may capture not only an image but also a voice and other sensor information. According to the present exemplary embodiment, a frame rate of the image capturing apparatus 101 is 60 frames per second (fps). In other words, the image capturing apparatus 101 captures an image of 60 frames per second. In addition, image capturing parameters, such as International Organization for Standardization (ISO) sensitivity and a shutter speed, appropriate for image capturing are set to the image capturing apparatus 101.

The image processing apparatuses 102-1 to 102-4 are apparatuses that perform image processing described below on images captured by the respective image capturing apparatuses 101 and are connected in a daisy chain manner thereto. Unless otherwise noted, the image processing apparatuses 102-1 to 102-4 are collectively referred to as an image processing apparatus(es) 102.

The image processing apparatus 102 has a function of separating a captured image captured by the image capturing apparatus 101 into a foreground image and a background image. For example, the image processing apparatus 102 separates a captured image (hereinbelow, also referred to as an image in some cases) captured by the image capturing apparatus 101 into a foreground image including an object with a motion (moving object) such as a player 202 extracted from the captured image, and a background image including an object maintaining a stationary state or a near stationary state such as a lawn. A moving object such as a player is referred to as an object (foreground). The object (foreground) may include a ball and a referee. A method for separating a foreground image and a background image is not limited to a background difference method, and a known method can be used. A still object means an object maintaining a stationary state or a near stationary state.

The image processing apparatus 102-1 generates a foreground image and a background image from an image captured by the image capturing apparatus 101-1 and transfers the generated images to the adjacent image processing apparatus 102-2. The image processing apparatus 102-2 generates a foreground image and a background image from an image captured by the image capturing apparatus 101-2 and transfers the generated images to the adjacent image processing apparatus 102-3 together with the data received from the image processing apparatus 102-1. By repeating such operations, the foreground images and the background images generated by the respective image processing apparatuses 102 are finally transferred to the virtual viewpoint image generation apparatus 100. According to the present exemplary embodiment, an example is described in which the foreground image and the background image are respectively transmitted at 60 fps and 1 fps, and the virtual viewpoint image generation apparatus 100 updates the virtual viewpoint image at 60 fps. According to the present exemplary embodiment, the example is described in which four image processing apparatuses are arranged. However, the number of the image processing apparatuses to be arranged is not limited thereto, and the image processing apparatuses 102 may be arranged according to the number of the image capturing apparatuses 101. Further, according to the present exemplary embodiment, the image processing apparatus 102 and the image capturing apparatus 101 are different apparatuses but may be arranged in a same housing or may be arranged as different apparatuses for each functional block.

The image capturing apparatus 101, the image processing apparatus 102, and the virtual viewpoint image generation apparatus 100 are installed in the stadium 201. An installation location of the virtual viewpoint image generation apparatus 100 is not limited in the stadium 201 and may be an outside of the stadium 201 or in a virtual server in, for example, a cloud.

The player 202 is an object existing in an image capturing area. In FIG. 1, one player is illustrated, but any number of players 202 may be included without being limited to one.

A network topology according to the present exemplary embodiment is daisy chain connection but not limited to the daisy chain connection. Star, bus, or mesh connection may be adopted via a relying device such as a hub. Further, not only a wired local area network (LAN) but also other wired connection, a wireless LAN, a public wireless network, and an Internet may be used.

Next, a functional configuration of the image processing apparatus 102 is described with reference to FIG. 2A.

An image input unit 120 has a function of receiving an image of 60 fps captured by the image capturing apparatus 101.

A foreground generation unit 121 has a function of clipping a portion including the player 202 from the captured image received by the image input unit 120 from the image capturing apparatus 101 and generating a foreground image. The foreground generation unit 121 generates a foreground image at 60 fps. In other words, foreground images are generated from all images periodically captured at 60 fps by the image capturing apparatus 101.

A background generation unit 122 has a function of generating a background image except for the player 202 from the image received by the image input unit 120 from the image capturing apparatus 101. A background portion that is not captured in the image because of the existence of the player 202 is combined with an image received in the past. The background generation unit 122 generates a background image at 1 fps. In other words, the background image is not generated from all of the images of 60 frames captured in a second by the image capturing apparatus 101 but is generated from the image of one frame.

A foreground image and a background image respectively generated by the foreground generation unit 121 and the background generation unit 122 are described with reference to FIG. 3.

An input image 250 is an image received by the image input unit 120 from the image capturing apparatus 101. The foreground generation unit 121 specifies a portion in which the player 202 is present from the input image 250 and extracts coordinates 251 of a foreground area including the player 202. Further, the foreground generation unit 121 generates a foreground image 252 based on information about the extracted coordinates. According to the present exemplary embodiment, an image having a rectangular shape is generated as the foreground image 252, but a shape is not limited thereto as long as a pixel capturing the player 202 is included therein.

The background generation unit 122 generates a background image 253 indicating a background area (field, etc.) except for the player 202 extracted by the foreground generation unit 121 from the input image 250. The background image may include a spectator stand, persons in the spectator stand, and a signboard.

A background data division unit 123 has a function of dividing the background image 253 generated by the background generation unit 122. A method for dividing the background image 253 is described below.

A transmission timing control unit 124 has a function of controlling a timing for transmitting the foreground image 252 generated by the foreground generation unit 121 and the background image divided by the background data division unit 123 to the subsequent image processing apparatus 102 or the virtual viewpoint image generation apparatus 100.

A transmission unit 125 has a function of transmitting the foreground image 252 generated by the foreground generation unit 121 and the background image divided by the background data division unit 123 to the subsequent image processing apparatus 102 or the virtual viewpoint image generation apparatus 100.

Next, a hardware configuration of the image processing apparatus 102 is described with reference to FIG. 2B. A hardware configuration of the virtual viewpoint image generation apparatus 100 is similar to that of the image processing apparatus 102 described below.

The image processing apparatus 102 includes a central processing unit (CPU) 211, a read-only memory (ROM) 212, a random access memory (RAM) 213, an auxiliary storage device 214, a display unit 215, an operation unit 216, a communication interface (I/F) 217, and a bus 218

The CPU 211 controls the entire image processing apparatus 102 using a computer program and data stored in the ROM 212 and the RAM 213 to realize each function of the image processing apparatus 102 illustrated in FIG. 1. The image processing apparatus 102 may include one or a plurality of pieces of dedicated hardware different from the CPU 211, and the dedicated hardware may execute at least a part of processing performed by the CPU 211. Examples of the dedicated hardware include an application specific integrated circuit (ASIC), a field-programmable gate array (FPGA), and a digital signal processor (DSP). The ROM 212 stores a program that does not need to be changed. The RAM 213 temporarily stores a program and data supplied from the auxiliary storage device 214 and data externally supplied via the communication I/F 217. The auxiliary storage device 214 includes, for example, a hard disk drive and stores various pieces of data such as image data and audio data.

The display unit 215 includes, for example, a liquid crystal display and a light-emitting diode (LED), and displays a graphical user interface (GUI) and the like for a user to operate the image processing apparatus 102. The operation unit 216 includes, for example, a keyboard, a mouse, a joy stick, and a touch panel, and inputs various instructions to the CPU 211 by receiving an operation by a user. The CPU 211 operates as a display control unit for controlling the display unit 215 and an operation control unit for controlling the operation unit 216. According to the present exemplary embodiment, the display unit 215 and the operation unit 216 are arranged inside the image processing apparatus 102. However, at least either one of the display unit 215 and the operation unit 216 may be arranged as a different device outside of the image processing apparatus 102.

The communication I/F 217 is used for communication between the image processing apparatus 102 and an external apparatus. For example, in a case where the image processing apparatus 102 is connected to the external apparatus in wired manner, a communication cable is connected to the communication I/F 217. In a case where the image processing apparatus 102 has a function of wirelessly communicating with the external apparatus, the communication I/F 217 includes an antenna. The bus 218 connects units in the image processing apparatus 102 with each other and transmits information therebetween.

Figure 4:
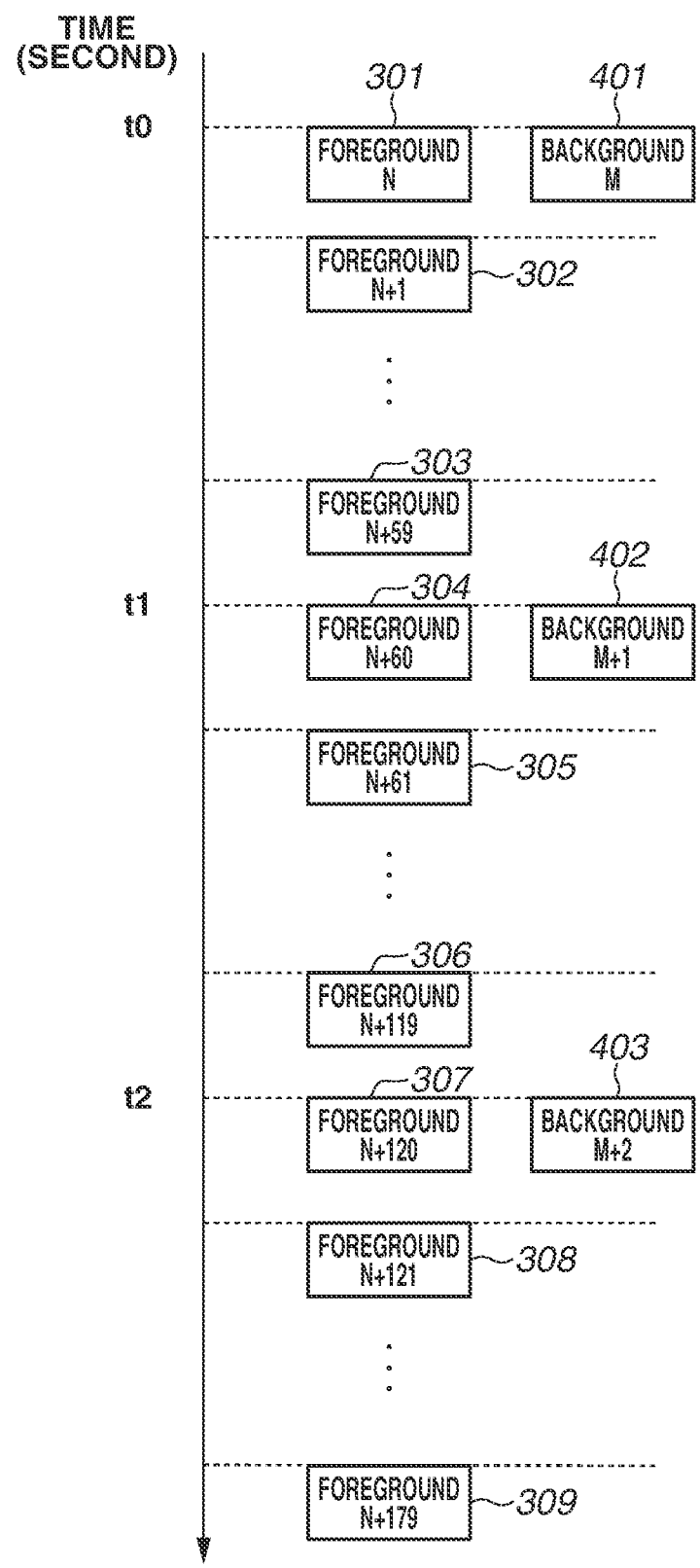
FIG. 4 is a diagram illustrating timings at which foreground images and background images are transmitted in a conventional example.

Next, timings for transmitting the foreground image 252 and the background image 253 are described with reference to FIG. 4. In FIG. 4, a conventional example (a case in which the background image 253 generated by the background generation unit 122 is transmitted without being divided) is described. An interval between time t0 and t1 and an interval between time t1 and t2 are respectively one second.

The foreground image 252 is generated by the foreground generation unit 121 every ¹⁄₆₀ seconds and is transmitted by the transmission unit 125 based on control by the transmission timing control unit 124. More specifically, each of a foreground N (301), a foreground N+1 (302), . . . , and a foreground N+59 (303) is generated and transmitted in one second from the time t0 to the time t1. Similarly, each of a foreground N+60 (304), a foreground N+61 (305), . . . , and a foreground N+119 (306) is generated and transmitted in one second from the time t1 to the time t2. Further, each of a foreground N+120 (307), a foreground N+121 (308), . . . , and a foreground N+179 (309) is generated and transmitted in next one second. In FIG. 4, a foreground N+2 to a foreground N+58, a foreground N+62 to a foreground N+118, and a foreground N+122 to a foreground N+178 are not illustrated.

The background image 253 is generated by the background generation unit 122 every second and is transmitted by the transmission unit 125 based on control by the transmission timing control unit 124. More specifically, a background M (401) is generated and transmitted in one second from the time t0 to the time t1. Similarly, a background M+1 (402) is generated and transmitted in one second from the time t1 to the time t2, and a background M+2 (403) is generated and transmitted in next one second.

As described above, both the foreground image and the background image are periodically generated based on the image periodically captured. However, a generation frame rate and a transmission frame rate of the background image are lower than a generation frame rate and a transmission frame rate of the foreground image. This is because, a foreground image including an imaging target with a motion such as a player is necessary to be output at a high frame rate so as to prevent deterioration of image quality, whereas a background image hardly changes with time and is output at a low frame rate so as to suppress a transmission data amount. As described above, the virtual viewpoint image generation apparatus 100 updates the virtual viewpoint image at 60 fps. In a case where the virtual viewpoint image of 60 frames per second is generated, the virtual viewpoint image is generated using the foreground image of 60 frames and the background image of one frame received from the image processing apparatus 102. At this time, the background image of the one frame is also used as the background image of remaining 59 frames.

Next, a data capacity flowing on the network in a case where the transmission timing control unit 124 performs control to transmit the foreground image and the background image respectively generated by the foreground generation unit 121 and the background generation unit 122 at timings when the foreground image and the background image are received is described with reference to FIG. 5.

Figure 5:
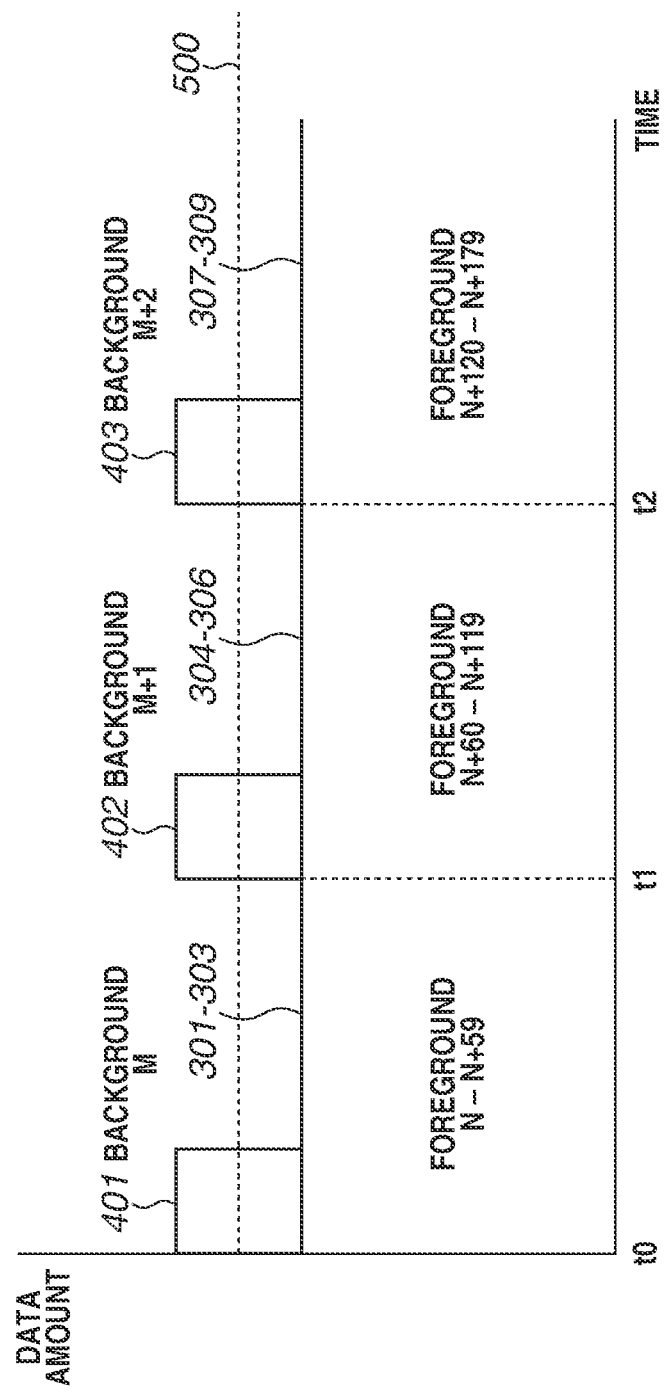
FIG. 5 is a diagram illustrating a data capacity flowing on a network in a conventional example.

As illustrated in FIG. 5, a data amount flowing on the network is temporarily increased during a period in which the background M (410), the background M+1 (411), or the background M+2 (412) is transmitted. As described above, if the data amount is temporarily increased, there is a possibility that the data amount exceeds a band on a network route to the virtual viewpoint image generation apparatus 100 or the processing performance that can be processed by the virtual viewpoint image generation apparatus 100. For example, in a case where the data amount exceeds an upper limit (500) of a network band, flow control (XON/XOFF) is performed between the image processing apparatus 102 and the virtual viewpoint image generation apparatus 100 during that period, and the data may be congested because of overhead. In addition, a data amount which can be transmitted may be decreased.

In order to solve the above-described issues, according to the present exemplary embodiment, an example is described in which the background data division unit 123 divides the background image, and the divided background images are transmitted at different timings to prevent temporary increase in a transmission data amount.

Figure 6:
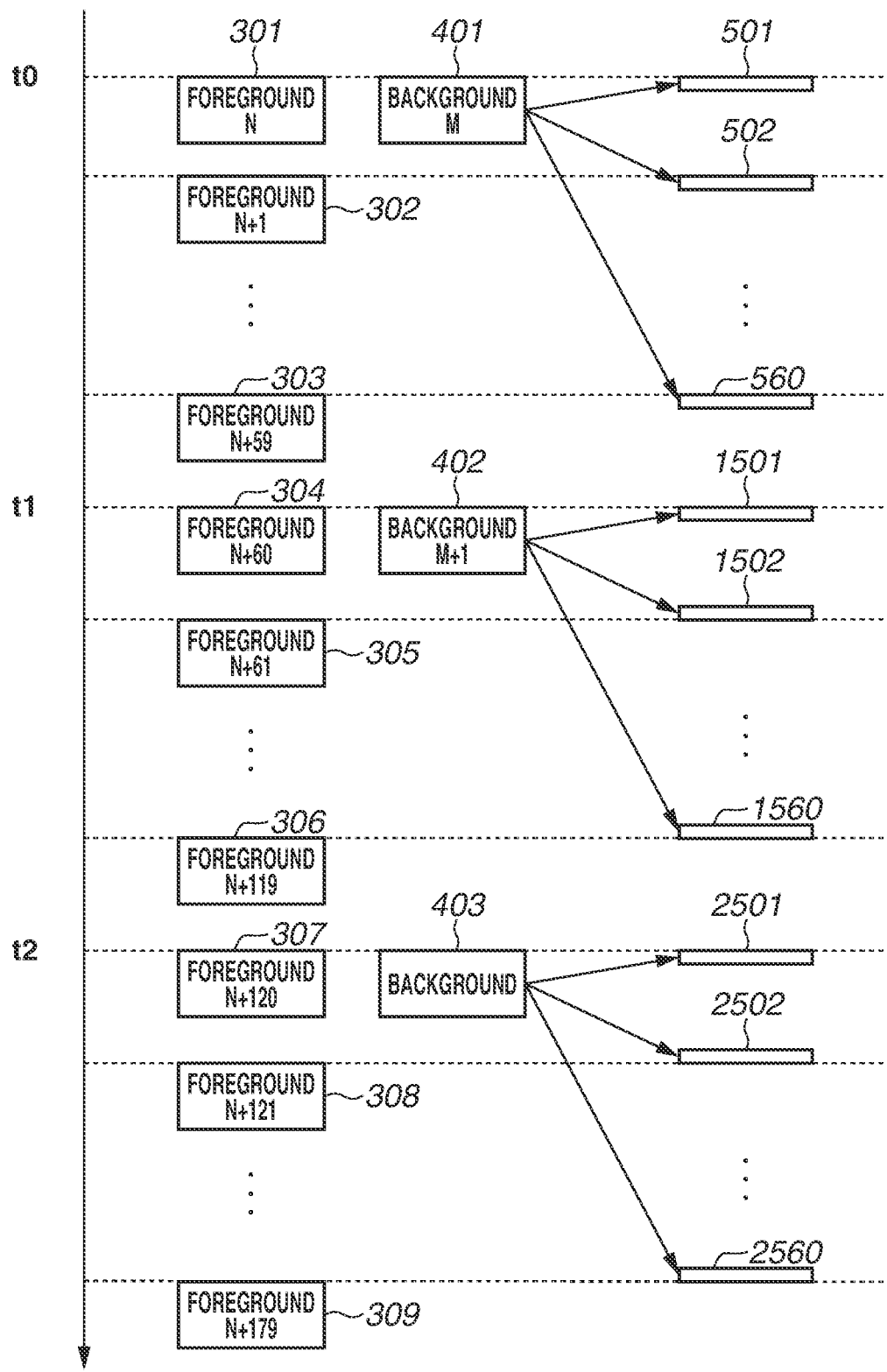
FIG. 6 is a diagram illustrating timings at which foreground images and background images are transmitted.

FIG. 6 is a diagram illustrating timings at which the foreground images and the background images divided by the background data division unit 123 are transmitted.

Generation of the foreground image and the background image is as described with reference to FIG. 5. The background data division unit 123 divides the background M (401) generated by the background generation unit 122 into 60 pieces and generates divided data 501, 502, . . . , and 560. In other words, the background data division unit 123 divides the background image into 60 pieces based on the transmission frame rate of the foreground image so that the divided background image can be transmitted at the same timing as transmission of the foreground image. Similarly, the background M+1 (402) and the background M+2 (403) are respectively divided into 60 pieces to generate divided data 1501, 1502, . . . , and 1560 and divided data 2501, 2502, . . . , and 2560.

The transmission timing control unit 124 temporarily accumulates the pieces of data divided by the background data division unit 123 in the memory. Then, the transmission timing control unit 124 sequentially transmits the accumulated divided data to the virtual viewpoint image generation apparatus 100 via the transmission unit 125 at a timing at which the foreground image is generated by the foreground generation unit 121. In other words, the divided background image is transmitted at 60 fps which is the same as the transmission frame rate of the foreground image.

Time information (time code) is added to the foreground image and the background image to be transmitted so as to be able to be identified that the image is generated based on which image captured at which timing. For example, to the foreground N (301), the foreground N+1 (302), . . . , and the foreground N+59 (303), time codes T0, T0+1, . . . , and T0+59 are respectively added. Further, to the foreground N+60 (304), the foreground N+61 (305), . . . , and the foreground N+119 (306), time codes T1, T1+1, . . . , and T1+59 are respectively added. Furthermore, to the divided background images 501, 502, . . . , and 506, time codes T0+d0, T0+d1, . . . , and T0+d59 are respectively added. The virtual viewpoint image generation apparatus 100 reconstructs the divided background image transmitted from the image processing apparatus 102 based on the time code. In the case of the above-described example, the background M (401) having the time code T0 is reconstructed from the divided background images having the time codes T0+d0, T0+d1, . . . , and T0+d59. Further, the virtual viewpoint image generation apparatus 100 superimposes the foreground image with the corresponding time code on the reconstructed background image and generates the virtual viewpoint image based on an arbitrary viewpoint. In the case of the above-described example, the foreground N (301), the foreground N+1 (302), . . . , and the foreground N+59 (303) with the time codes T0, T0+1, . . . , and T0+59 corresponding to the background M (401) are superimposed on the background M (401).

Figure 7:
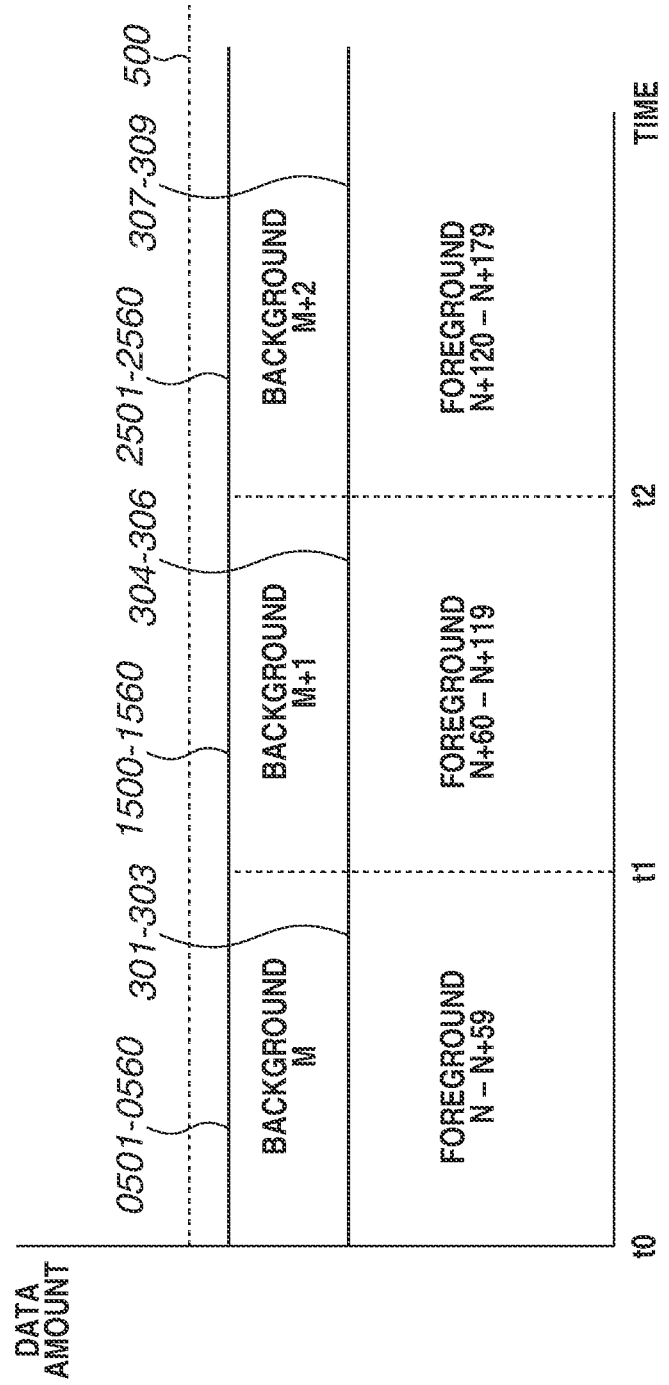
FIG. 7 is a diagram illustrating a data capacity flowing on a network.

FIG. 7 is a diagram illustrating data flowing on the network at that time. As described above, the background M (401), the background M+1 (402), and the background M+2 (403) are divided and then transmitted, so that these pieces of data are transmitted in a leveled manner. Therefore, the network band to the virtual viewpoint image generation apparatus 100 can be efficiently used, and a large amount of data can be prevented from abruptly reaching the virtual viewpoint image generation apparatus 100. Accordingly, data transmission can be completed within a range of the upper limit (500) of the network band. In addition, there is no need to reduce a transmission amount of the foreground image in a case where the background image is transmitted, and thus quality of the virtual viewpoint image to be generated by the virtual viewpoint image generation apparatus 100 is not deteriorated.

Figure 8:
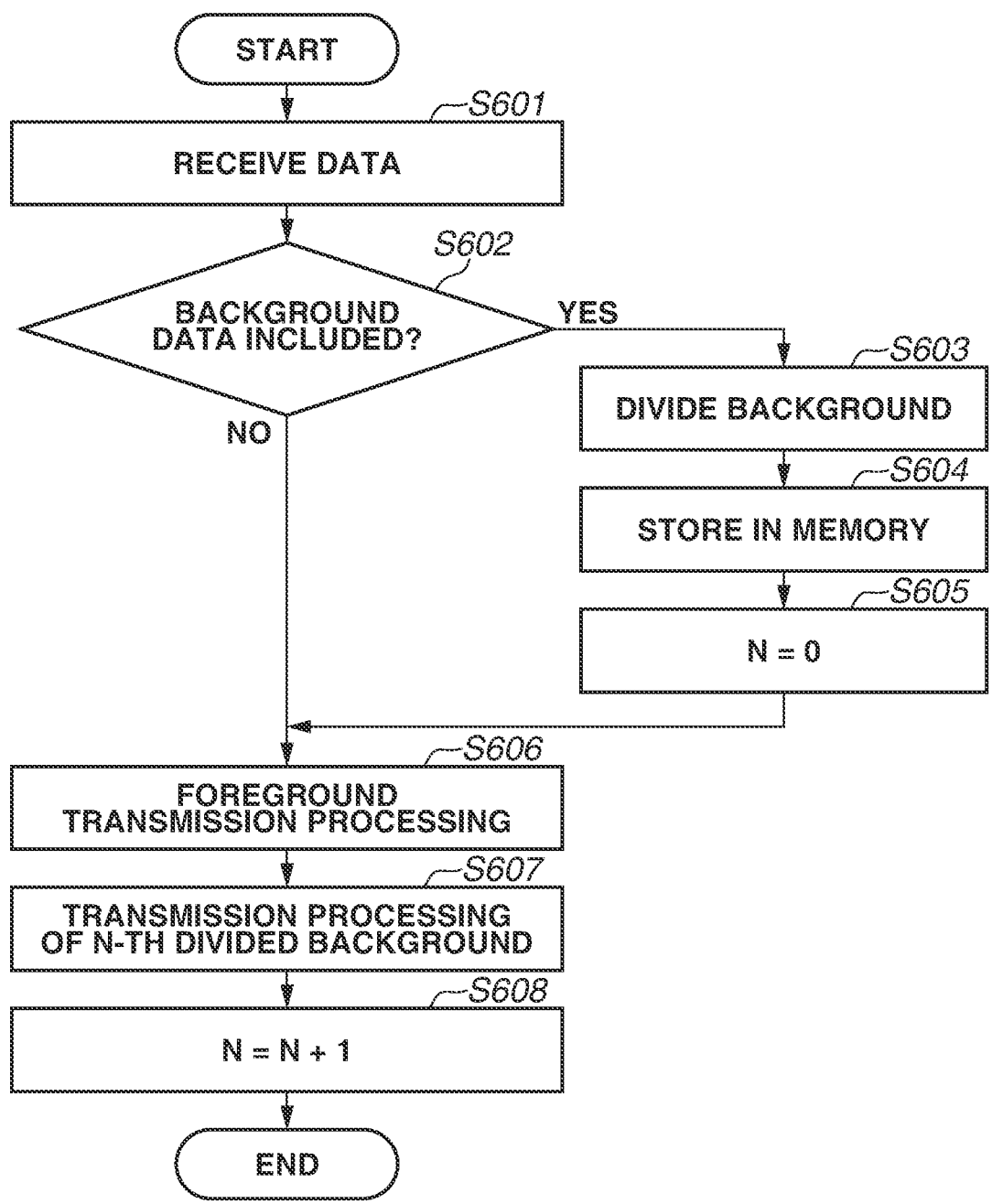
FIG. 8 is a flowchart illustrating processing by the image processing apparatus.

Next, a processing flow of the transmission timing control unit 124 is described with reference to FIG. 8.

In step S601, the transmission timing control unit 124 receives data generated by the foreground generation unit 121 or the background generation unit 122. As described above, the foreground image and the background image are respectively generated at 60 fps and 1 fps. The transmission timing control unit 124 may be started up every ¹⁄₆₀ seconds in synchronization with the timing at which the foreground generation unit 121 generates the foreground image and obtains the data by accessing the memory storing the data generated by the foreground generation unit 121 or the background generation unit 122.

Next, in step S602, the transmission timing control unit 124 determines whether the received data includes only the foreground image.

As a result of the determination in step S602, if the received data includes both the foreground image and the background image or only the background image (YES in step S602), the processing proceeds to step S603. In step S603, the transmission timing control unit 124 causes the background data division unit 123 to divide the background image. In this case, the transmission timing control unit 124 causes the background data division unit 123 to divide the background image into 60 pieces based on the frame rate at which the foreground generation unit 121 generates and transmits the foreground image. A division method includes methods described below but is not limited to these methods.

(1) The background image is equally divided so that a data size of each divided background image is equal to each other.

(2) The size of the data to be transmitted is determined to have a multiple of a minimum maximum transmission unit (MTU) size in the network to the virtual viewpoint image generation apparatus 100. The size is a multiple of the minimum MTU size, and thus a fragment of the data can be suppressed in the middle of the network.

(3) The background image is divided based on a color difference. For example, in a case of a red-green-blue (RGB) color space, the background image is divided into three pieces for respective RGB colors, and each divided data is further divided into 20 pieces. In addition, the data may be compressed after being divided into three for RGB colors.

(4) The background image is divided based on gradation. For example, in a case of 10 bits, 10 bits are divided into high-order 7 bits and remaining 3 bits. Each of the divided data is further divided and transmitted from the high-order bit. For example, in a case where a data amount of the foreground image 252 is increased, band overflow can be suppressed by transmitting only the high-order bit data and not transmitting the low-order bit data.

(5) The background image is divided in units of block. For example, in a case where a compression method in which compression is performed in units of block such as Joint Photographic Experts Group (JPEG) is used, the background image is divided in units of block. In this way, expansion processing can be performed at each time without reconstructing the divided data received by the virtual viewpoint image generation apparatus 100.

(6) The background image is divided based on brightness and a color difference, and then the divided data is further divided. In this case, it is desirable to transmit background image divided based on the brightness first.

(7) The background image is divided based on a request from the virtual viewpoint image generation apparatus 100. In this case, the virtual viewpoint image generation apparatus 100 specifies coordinates and a size to be divided, and a transmission order.

Next, in step S604, the data divided in step S603 is temporarily stored in the memory. In step S605, the transmission timing control unit 124 sets a counter N to 0.

Next, in step S606, the transmission timing control unit 124 performs foreground transmission processing. In a case where the foreground data is received in step S601, the foreground data is transmitted to the subsequent image processing apparatus 102 or the virtual viewpoint image generation apparatus 100 via the transmission unit 125.

Next, in step S607, the transmission timing control unit 124 transmits the N-th divided background image stored in the memory in step S604 to the subsequent image processing apparatus 102 or the virtual viewpoint image generation apparatus 100 via the transmission unit 125. In step S608, the transmission timing control unit 124 increments the counter N. Accordingly, in a case where a next foreground image is received, next divided background images are transmitted together with the foreground image. In this way, all of the background images divided into 60 pieces are transmitted at the transmission frame rate of the foreground image.

As described above, even in the case where the foreground image and the background image are generated at different frame rates, the transmission data amount can be leveled by dividing and transmitting the background image. Accordingly, the performance of the virtual viewpoint image generation apparatus 100 and the hand to the virtual viewpoint image generation apparatus 100 can be efficiently used, and the virtual viewpoint image generation apparatus 100 can stably generate a virtual viewpoint image.

According to the above description, it is described that transmission of the divided background image is completed by a next timing at which the virtual viewpoint image is updated. For example, as illustrated in FIG. 7, it is described that transmission of pieces of data 1500 to 1560 obtained by dividing the background M+1 generated from the image captured at the time t1 is completed by the time t2. In a case where the transmission is completed by the time t2, the virtual viewpoint age can be updated by reconstructing the background M+1 from the divided background images 1500 to 1560 and combining the background M+1 with each of the foregrounds N+60 to N+119 as described above. However, depending on a condition of the network, even if the background image is divided and transmitted, the transmission of the background images 1500 to 1560 may not be completed by the time t2 because of a shortage of the band in some cases. In such a case, not all of the divided background images are transmitted, and thus the background image may not be updated. In this case, the virtual viewpoint image may be generated using the background M of the previous timing.

According to the above description, the generation and transmission frame rate of the foreground image is 60 fps, which is the same frame rate as that of the image capturing apparatus, but the frame rate is not limited to 60 fps. As the frame rate is higher, the virtual viewpoint image to be generated by the virtual viewpoint image generation apparatus 100 becomes smoother, but, on the other hand, a processing capacity and a transmission data amount increase. Therefore, it is desirable to set a frame rate appropriately based on a use environment.

According to the above description, the generation frame rate of the background image is 1 fps, but the frame rate only needs to be lower than the generation frame rate of the foreground image without being limited to 1 fps. In other words, a frequency of generating the background image may be lower than a frequency of generating the foreground image.

Further, the foreground image and the background image may be generated at the same frame rate, all of the generated foreground images may be transmitted, and not all the generated background images may be transmitted by thinning out a part. For example, the foreground image and the background image are both generated at 60 fps. Regarding the foreground image, all of 60 frames of images generated in one second are transmitted, and, regarding the background image, only one frame out of 60 frames of images may be transmitted. In other words, the present disclosure can be applied to a case in which a frequency necessary for reproducing the virtual viewpoint image is lower in the background image than in the foreground image.

Further, according to the above description, the example is described in which the background image is divided into 60 pieces so that one of the divided background images is transmitted each time the foreground image is transmitted.

However, division of the background image is not limited to the above-described example. For example, the background image may be divided into 30 pieces, and one of the divided background images may be transmitted at 30 fps. Further, it is not necessarily needed to transmit all of the divided background images at different timings. For example, processing may be performed in which first to third divided background images are transmitted at a first timing, and fourth to sixth divided background images are transmitted at a second timing in 60 pieces of the divided background images.

Further, according to the above description, the foreground image and the background image are both generated at predetermined periods. However, the generation timing and the transmission timing needs not necessarily periodic. For example, in a case where the background image is be generated at 1 fps, the background image only needs to be generated from one frame of a captured image within one second and needs not necessarily be generated every second.

Further, according to the above description, the example is described in which the image processing apparatus 102 generates the foreground image and the background image. However, another apparatus may generate both of or either one of the foreground image and the background image. For example, the image capturing apparatus 101 may generate the foreground image and the background image, and the image processing apparatus 102 may obtain the foreground image and the background image from the image capturing apparatus 101 and transmit the foreground image and the background image to the subsequent image processing apparatus 102 or the virtual viewpoint image generation apparatus 100.

Further, according to the above description, the system is described in which the virtual viewpoint image generation apparatus 100 generates the virtual viewpoint image based on the foreground image and the background image transmitted by the image processing apparatus 102. However, the present disclosure can be applied to another system.

As described above, the image processing apparatus according to each of the above-described exemplary embodiments generates a background image at a frequency lower than a frequency for generating a foreground image in generating the foreground image including an object and the background image not including the object from an image captured by the image capturing apparatus. Accordingly, the deterioration of image quality of the foreground image including an object such as a person with a motion as time lapses, can be prevented, and a transmission data amount can be reduced in the background image which has no change or small change as time lapses. Further, the generated background image is divided, and each of the divided background image is transmitted together with the foreground image to the other image processing apparatus or the virtual viewpoint image generation apparatus. In this way, a transmission band can be used in a leveled condition, and thus it is possible to reduce a possibility that a data amount exceeds an upper limit of the transmittable data amount, and a possibility that the data amount exceeds processable amount of the apparatus generating a virtual viewpoint image. Accordingly, a virtual viewpoint image which does not give a feeling of strangeness can be provided to a user.

According to the present disclosure, a possibility of occurrence of failure, which is caused by transmitting all the background images at the same time in a case where foreground images and the background images generated from an image captured by an image capturing apparatus are transmitted, can be reduced.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-064367, filed Mar. 28, 2019, which is hereby incorporated by reference herein in its entirety.

What is claimed is:

1. An image processing apparatus comprising:
   one or more memories storing instructions; and
   one or more processors executing the instructions to:
   generate, based on an image captured by an image capturing apparatus, a foreground image which includes a foreground object, which is a transmission target and which is used for generating a virtual viewpoint image according to a virtual viewpoint;
   generate, based on an image captured by the image capturing apparatus, a background image which does not include the foreground object, which is a transmission target and which is used for generating the virtual viewpoint image according to the virtual viewpoint, a frequency of generating the background image being lower than that of generating the foreground image;
   divide the generated background image into a plurality of items of image data including first image data and second image data;
   transmit the generated foreground image; and
   transmit the divided plurality of items of image data, the first image data and the second image data being transmitted at different timings.

2. The image processing apparatus according to claim 1, wherein the foreground image is generated at a first period, and
   wherein the background image is generated at a second period longer than the first period.

3. The image processing apparatus according to claim 2, wherein the image capturing apparatus captures an image at the first period, and
wherein the foreground image is generated from each of a plurality of images captured at the first period.

4. The image processing apparatus according to claim 2, wherein the foreground image is transmitted at the first period.

5. The image processing apparatus according to claim 2, wherein the background image is divided into the plurality of items of image data based on the first period.

6. The image processing apparatus according to claim 5, wherein the second image data is transmitted after a time corresponding to the first period has elapsed from the transmission of the first image data.

7. The image processing apparatus according to claim 1, wherein the foreground image is generated at a first frame rate, and
wherein the background image is generated at a second frame rate lower than the first frame rate.

8. The image processing apparatus according to claim 7, wherein the image capturing apparatus captures an image at the first frame rate, and
wherein the foreground image is generated from each of a plurality of images captured at the first frame rate.

9. The image processing apparatus according to claim 7, wherein the foreground image is transmitted at the first frame rate.

10. The image processing apparatus according to claim 7, wherein the background image is divided into the plurality of items of image data based on the first frame rate.

11. The image processing apparatus according to claim 10, wherein the second image data is transmitted after a time corresponding to the first frame rate has elapsed from the transmission of the first image data.

12. The image processing apparatus according to claim 1, wherein the background image is divided into the plurality of items of image data based on a data size of the background image.

13. The image processing apparatus according to claim 1, wherein the background image is divided into the plurality of items of image data based on at least one of items of information about a color, a gradation, and brightness of the background image.

14. The image processing apparatus according to claim 1, wherein the background image is divided into the plurality of items of image data in units of block in a case where data is compressed by a compression method for performing compression in units of block.

15. The image processing apparatus according to claim 1, wherein the foreground image and the background image are used for generating a virtual viewpoint image based on virtual viewpoint.

16. The image processing apparatus according to claim 1, wherein the image processing apparatus is connected to one or more other image processing apparatuses in a daisy chain manner.

17. The image processing apparatus according to claim 1, wherein the foreground object includes at least any one of a player, a ball, and a referee.

18. The image processing apparatus according to claim 1, wherein a time code of each of the divided plurality of items of image data is determined according to a specific rule for a time code of the generated background image.

19. The image processing apparatus according to claim 18, wherein a time code of each of the divided plurality of items of image data is a time code for reconstructing the generated background image.

20. A non-transitory computer-readable storage medium storing a program for causing a computer to execute a method for image processing, the method comprising:
generating based on an image captured by an image capturing apparatus, a foreground image which includes a foreground object, which is a transmission target and which is used for generating a virtual viewpoint image according to a virtual viewpoint;
generating based on an image captured by the image capturing apparatus, a background image which does not include the foreground object, which is a transmission target and which is used for generating the virtual viewpoint image according to the virtual viewpoint, a frequency of generating the background image being lower than that of generating the foreground image;
dividing the generated background image into a plurality of items of image data including first image data and second image data;
transmitting the generated foreground image; and
transmitting the divided plurality of items of image data, the first image data and the second image data being transmitted at different timings.

21. A method for image processing, the method comprising:
acquiring the foreground image generated from an image captured by an image capturing apparatus;
generating based on an image captured by an image capturing apparatus, a foreground image which includes a foreground object, which is a transmission target and which is used for generating a virtual viewpoint image according to a virtual viewpoint;
generating based on an image captured by the image capturing apparatus, a background image which does not include the foreground object, which is a transmission target and which is used for generating the virtual viewpoint image according to the virtual viewpoint, a frequency of generating the background image being lower than that of generating the foreground image;
dividing the generated background image into a plurality of items of image data including first image data and second image data;
transmitting the generated foreground image; and
transmitting the divided plurality of items of image data, the first image data and the second image data being transmitted at different timings.

* * * * *